April 13, 1926.
G. GAGLIO
1,580,818
SAFETY DEVICE FOR AUTOMOBILES
Filed Nov. 24, 1925
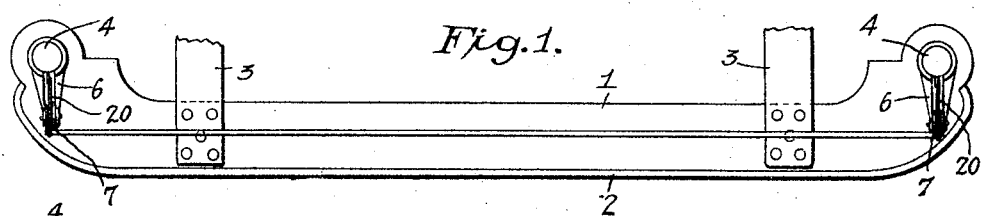
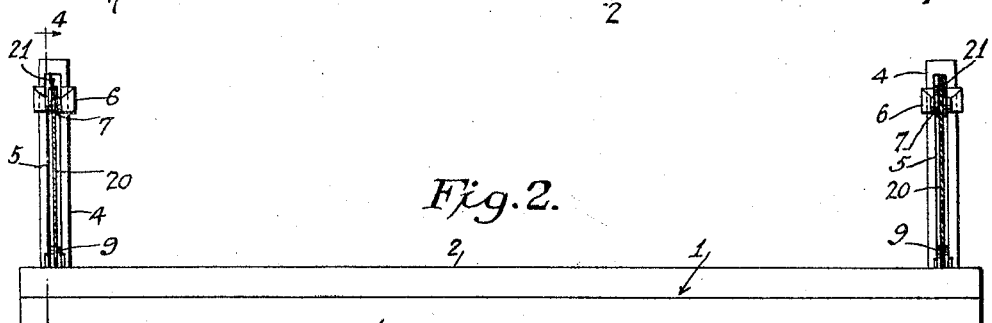
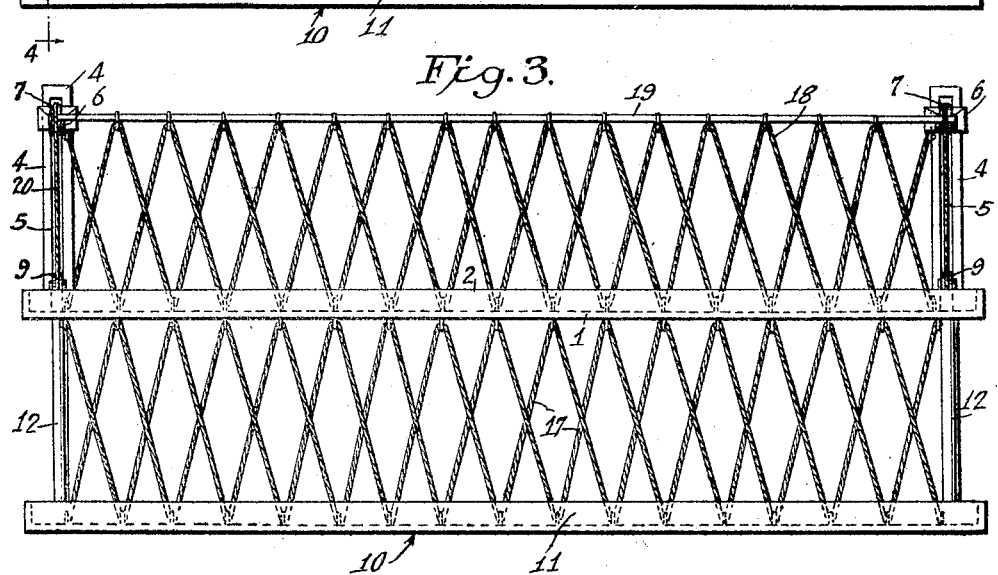
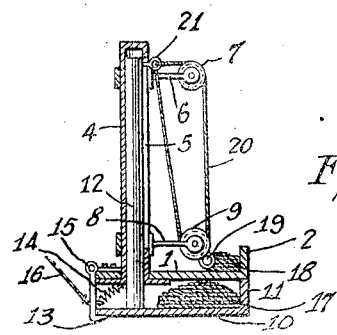
INVENTOR
Giuseppe Gaglio
BY John A. Naismith
ATTORNEY Patented Apr. 13, 1926.

1,580,818

UNITED STATES PATENT OFFICE.

GIUSEPPE GAGLIO, OF SAN JOSE, CALIFORNIA.

SAFETY DEVICE FOR AUTOMOBILES.

Application filed November 24, 1925. Serial No. 71,174.

*To all whom it may concern:*

Be it known that I, GIUSEPPE GAGLIO, a citizen of the United States, and a resident of San Jose, in the county of Santa Clara and State of California, have invented certain new and useful Improvements in Safety Devices for Automobiles, of which the following is a specification.

It is one object of the invention to provide a device of the character indicated that will normally function as a bumper on the forward end of an automobile, but that may upon an instants notice be extended to form a practical and efficient guard extending the full width of the machine and a distance above and below the bumper.

It is another object of the invention to provide a device of the character indicated that will be simple in form and construction, quickly and easily operated, and highly efficient in its practical application.

In the drawing:—

Figure 1 is a plan view of the device, a part of its supporting means being broken away.

Figure 2 is a front elevation of the same.

Figure 3 is a front elevation of the device when fully extended to function as guard and bumper.

Figure 4 is a sectional view on line 4—4 of Figure 2.

Referring more particularly to the drawing, I show at 1 a bumper bar having an upstanding flange along its forward edge as shown at 2 and mounted in a fixed position on an automobile chassis is any suitable manner as by supporting bars shown in part at 3—3.

Rigidly mounted upon each end of bumper bar 1 is an upstanding tubular member 4 having a vertical slot as 5 in its forward portion. Mounted on each tubular member 4 and adjacent to the upper end of slot 5 is a forwardly projecting arm 6 carrying a sheave 7. Adjacent to the lower end of slot 5 and rigidly mounted on the tubular member 4 is a forwardly projecting arm 8 carrying a sheave 9.

At 10 I show a bar having the same general conformation as bumper bar 1 and provided with an upstanding flange 11 along its forward edge. On each end of the bar 10 is mounted an upstanding rod 12 of such proportions and so positioned as to engage the tubular member directly thereabove on bumper bar 1. These rods 12 and their corresponding tubular member 4 cooperate to permit the bar 10 to slide up and down in parallel relation to the bumper bar 1. When the bar 10 is close to bar 1 with the upper edge of its flange 11 in contact with the lower surface thereof, it is held by a catch 13 normally held in engagement therewith by a spring 14, the catch being pivotally mounted on the bumper bar 1 as shown at 15. Secured to catch 13 is a cord 16 which may be operated from the seat of the automobile to disengage the catch from the bar 10 and permit it to drop away from the bumper bar 1.

At 17 I show a net of any suitable material such as heavy cord attached to the under side of bar 1 along a line parallel with its forward edge, and also attached to the upper side of the bar 10 along a line parallel with its forward edge. This net is folded up on the bar 10 when said bar is held up close against bar 1, but operates as a support for bar 10 when it is permitted to drop away therefrom.

At 18 I show a second net attached to the upper side of the bumper bar 1 as shown along one edge and to a rod 19 along the other edge.

To each end of rod 19 is fastened a suitable cord or cable 20, this cord or cable passing over both of the sheaves 7 and 9 on arms 6 and 8 respectively, and being attached to an eye 21 mounted on the upper end of rod 12 and projecting through slot 5.

Under normal conditions the device functions as a bumper only, as clearly shown in Figures 1 and 2.

When however, the driver of the machine sees that he is going to strike a person or an object in the roadway he may disengage the catch 13 by a quick pull on the cable 16, thereby releasing bar 10 and permitting it to fall into the position shown in Figure 3. Since the cable 20 is attached to the rods 12 near their upper ends the downward movement of the said rods operates the cables to raise the upper net 18, so that the single act of releasing the catch 13 automatically throws both nets 17 and 18 into their respective operative positions. The nets are of course automatically returned to their normal positions when the lower bar is raised to engage the catch 13.

It is to be understood, of course, that while I have herein shown and described one specific embodiment of my invention, changes in form, construction, and method of operation may be made within the scope of the appended claims.

I claim:—

1. A safety device for automobiles, comprising a fixed bar, a vertically movable bar mounted thereon in parallel relation thereto, a flexible net mounted on said bars along their opposite edges, a second flexible net mounted on said first mentioned bar along one edge, and means operated by the movement of the second bar relative to the first mentioned bar for extending the second mentioned net.

2. A safety device for automobiles, comprising a fixed bumper bar mounted thereon in a horizontal plane, a vertically movable bar arranged in parallel relation thereto and below said first bar, a flexible net connecting said bars, releasable means for normally supporting said second bar in close relation to said first bar, a net mounted upon the upper side of said first bar along one edge, and means operated by the movement of the second bar relative to the first bar for raising the free edge of said second net above said first bar.

3. A safety device for automobiles comprising a bumper bar mounted thereon in a horizontal plane and having a vertically arranged cylinder mounted on each end thereof provided with upper and lower openings and supporting guides adjacent to said openings, a second bar arranged in parallel relation to said first mentioned bar and below the same and movable relative thereto, a vertically arranged rod mounted on each end of said second bar to slidably engage the adjacent cylinder on the first mentioned bar, a net connecting said bars, a second net mounted on the upper side of the first mentioned bar, a cable connected to each end of said last mentioned net, each of said cables passing over the guides and through the openings in the adjacent cylinder and connected to the rod sliding therein, and releasable means for supporting the second bar in closed relation to said first bar.

GIUSEPPE GAGLIO.